(12) United States Patent
Choji et al.

(10) Patent No.: US 9,379,589 B2
(45) Date of Patent: Jun. 28, 2016

(54) STATOR

(75) Inventors: Tatsuya Choji, Utsunomiya (JP);
Michihisa Kono, Utsunomiya (JP);
Kazuaki Takizawa, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 13/991,125

(22) PCT Filed: Nov. 29, 2011

(86) PCT No.: PCT/JP2011/077541
§ 371 (c)(1),
(2), (4) Date: Aug. 1, 2013

(87) PCT Pub. No.: WO2012/073959
PCT Pub. Date: Jun. 7, 2012

(65) Prior Publication Data
US 2013/0302152 A1 Nov. 14, 2013

(30) Foreign Application Priority Data
Dec. 3, 2010 (JP) .................................. 2010-270700

(51) Int. Cl.
*H02K 5/04* (2006.01)
*H02K 5/24* (2006.01)
(Continued)

(52) U.S. Cl.
CPC . *H02K 5/04* (2013.01); *B60L 11/14* (2013.01); *F01D 9/00* (2013.01); *H02K 1/148* (2013.01);
(Continued)

(58) Field of Classification Search
CPC ............. H02K 5/24; H02K 5/04; H02K 1/18; H02K 1/148; H02K 1/185; H02K 21/16; H02K 3/522; H02K 7/006; B60L 11/14; B60L 2220/50; B60L 2270/142; B60L 2270/145; F01D 9/00; Y02T 10/70; Y02T 10/641; Y02T 10/7077
USPC ...................... 310/216.007, 216.008, 216.055
See application file for complete search history.

(56) References Cited

U.S. PATENT DOCUMENTS

2004/0032177 A1* 2/2004 Nitzsche et al. ................. 310/91
2006/0125330 A1* 6/2006 Winkler et al. ................. 310/51
(Continued)

FOREIGN PATENT DOCUMENTS

CN         1348245 A   *  5/2002
CN         201466846 U     5/2010
(Continued)

OTHER PUBLICATIONS

Machine translation of CN1348245(A), Noda et al., Stator for Rotary Electric Machine, May 8, 2002, Toshiba Elevator Technos Co LT.*
(Continued)

*Primary Examiner* — Terrance Kenerly
*Assistant Examiner* — Alexander Singh
(74) *Attorney, Agent, or Firm* — Westerman, Hattori, Daniels & Adrian, LLP

(57) ABSTRACT

A stator includes: a plurality of stator pieces around which coils are wound; a stator holder which supports the plurality of stator pieces by arranging the plurality of stator pieces in a peripheral wall portion in an annular shape; and a housing which is disposed on an outer side of the stator holder to support the stator holder, wherein the stator holder includes a flange portion which continuously protrudes outward in a radial direction thereof from an edge of one end side in an axial line direction thereof and is fixed to the housing, and a reinforcing portion which suppresses vibration in the radial direction of the stator holder on an outer peripheral surface of the peripheral wall portion.

7 Claims, 8 Drawing Sheets

(51) Int. Cl.
    *H02K 1/18*     (2006.01)
    *H02K 21/16*    (2006.01)
    *F01D 9/00*     (2006.01)
    *B60L 11/14*    (2006.01)
    *H02K 1/14*     (2006.01)
    *H02K 3/52*     (2006.01)
    *H02K 7/00*     (2006.01)

(52) U.S. Cl.
    CPC .................. *H02K 1/18* (2013.01); *H02K 1/185* (2013.01); *H02K 3/522* (2013.01); *H02K 5/24* (2013.01); *H02K 21/16* (2013.01); *B60L 2220/50* (2013.01); *B60L 2270/142* (2013.01); *B60L 2270/145* (2013.01); *H02K 7/006* (2013.01); *Y02T 10/641* (2013.01); *Y02T 10/70* (2013.01); *Y02T 10/7077* (2013.01)

(56) References Cited

U.S. PATENT DOCUMENTS

| | | | | |
|---|---|---|---|---|
| 2006/0255666 | A1* | 11/2006 | Williams et al. | 310/51 |
| 2007/0080592 | A1* | 4/2007 | Ohta et al. | 310/71 |
| 2010/0244618 | A1* | 9/2010 | Kikuichi | 310/216.129 |

FOREIGN PATENT DOCUMENTS

| | | |
|---|---|---|
| JP | 55-160947 A | 12/1980 |
| JP | 01-285687 A | 11/1989 |
| JP | 2005-312151 A | 11/2005 |
| JP | 2005-312152 A | 11/2005 |
| JP | 2007-288903 A | 11/2007 |
| JP | 2008-193806 A | 8/2008 |
| JP | 2009-077603 A | 4/2009 |
| JP | 2009-131006 A | 6/2009 |
| JP | 2009-153269 A | 7/2009 |
| JP | 2009-278862 A | 11/2009 |
| JP | 2010-136480 A | 6/2010 |

OTHER PUBLICATIONS

Notice of Allowance dated May 27, 2014, issued in Corresponding Japanese Patent Application No. 2012-546888, with English Translation (6 pages).

Office Action dated Dec. 2, 2014, issued in corresponding Chinese Patent Application No. 201180057542.7, with English Translation (11 pages).

International Search Report, PCT/JP2011/077541, dated Jan. 17, 2012.

* cited by examiner

STATOR

CROSS-REFERENCE TO RELATED APPLICATIONS

This application is a National Stage entry of International Application No. PCT/JP2011/077541, filed Nov. 29, 2011, which claims priority to Japanese No. 2010-270700, filed Dec. 3, 2010. The disclosures of the prior applications are hereby incorporated in their entirety by reference.

TECHNICAL FIELD

The present invention relates to a stator which is used in a rotating electrical machine such as a motor or a generator.

Priority is claimed on Japanese Patent Application No. 2010-270700, filed on Dec. 3, 2010, the content of which is incorporated herein by reference.

BACKGROUND ART

As a stator of a motor or the like, a stator in which a cylindrical stator holder is fixed to a housing by bolts, an annular stator group made by arranging a plurality of stator pieces around which coils are wound in an annular shape is press-fitted to the inside of the stator holder to be held, and wiring members for feeding power to the coils of each of the stator pieces are provided along the annular stator group is known. In addition, in this type of stator holder of the motor, a flange portion which is fixed to the housing is provided at one end side in the axial line direction thereof.

In Patent Document 1, a stator holder provided with an introduction portion at the other end side in the axial line direction, that is, at the opposite side to a flange portion in order to enable smooth press-fitting when an annular stator group is press-fitted to the inside of the stator holder is disclosed. Specifically, referring to FIGS. 12 and 13, a stator holder 103 includes a peripheral wall portion 104, and a flange portion 112 is provided at one end side in the axial line direction of the peripheral wall portion 104. The peripheral wall portion 104 is constituted by a small-diameter cylindrical portion 131, a tapered cylindrical portion 132, a large-diameter cylindrical portion 133, and arc surfaces 134a and 134b for smooth connection of the cylindrical portions.

The introduction portion 107 is constituted by the large-diameter cylindrical portion 133 of the peripheral wall portion 104, the tapered cylindrical portion 132, and the arc surfaces 134a and 134b. That is, the tapered cylindrical portion 132 is formed so that the inside diameter of the peripheral wall portion 104 of the stator holder 103 is continuously reduced toward one end side in the axial line direction from the other end side in the axial line direction. Accordingly, regarding the stator according to the related art, when the annular stator group is press-fitted to the stator holder 103, the annular stator group is able to be press-fitted not only from the flange portion 112 side but also from the introduction portion 107 on the opposite side thereto.

CITATION LIST

Patent Document

[Patent Document 1] Japanese Unexamined Patent Application, First Publication No. 2005-312151

SUMMARY OF INVENTION

Technical Problem

However, the stator including the annular stator group has a structure in which the natural frequency of the annular stator group is low, and when the motor is rotated at a low speed, the stator pieces that constitute the annular stator group easily vibrate. Accordingly, when the motor is rotated at a low speed, vibration is easily transmitted to the stator holder. However, in the stator holder 103 according to the related art described above, the rigidity of the vicinity of the introduction portion 107 is low, the vibration of the annular stator group is not able to be suppressed, and thus there is a problem in that vibration noise is generated.

The present invention has been made taking the circumstances into consideration, and an object thereof is to provide a stator capable of suppressing vibration noise by suppressing deformation of a stator holder in a radial direction.

Solution to Problem

A stator according to the present invention employed the following means for accomplishing the above-mentioned object.

(1) According to an aspect of the present invention, a stator includes: a plurality of stator pieces around which coils are wound; a stator holder which supports the plurality of stator pieces by arranging the plurality of stator pieces in a peripheral wall portion in an annular shape; and a housing which is disposed on an outer side of the stator holder to support the stator holder, wherein the stator holder includes a flange portion which continuously protrudes outward in a radial direction thereof from an edge of one end side in an axial line direction thereof and is fixed to the housing, and a reinforcing portion which suppresses vibration in the radial direction of the stator holder on an outer surface of the peripheral wall portion of the stator holder.

(2) In the aspect of (1), the reinforcing portion may be another flange portion that continuously protrudes outward in the radial direction from an edge of the other end side in the axial line direction of the peripheral wall portion of the stator holder.

(3) In the aspect of (1), the reinforcing portion may be a plurality of convex portions which are provided across a corner portion between the outer peripheral surface of the peripheral wall portion and the flange portion, and the convex portions may be arranged at predetermined intervals along the peripheral direction.

(4) In the aspect of (3), the convex portion may have a shape in which a protruding height thereof is gradually reduced from the flange portion to reach the peripheral wall portion.

(5) In the aspect of (1), the reinforcing portion may be a convex strip which continuously protrudes from the outer peripheral surface of the peripheral wall portion.

Advantageous Effects of Invention

According to the aspect of (1), by providing the reinforcing portion, deformation of the stator holder in the radial direction may be suppressed. Accordingly, vibration of the stator pieces that constitute the stator is suppressed, and thus the vehicle interior sound may be reduced.

According to the aspect of (2), since another flange portion is provided over the entire periphery of the peripheral wall portion, deformation of the peripheral wall portion in the"

radial direction is suppressed by the flange portion and the other flange portion, and thus the rigidity of the stator holder may further be increased.

In addition, an inner peripheral surface of the peripheral wall portion is flat, and thus the area where the plurality of stator pieces abut on the inner peripheral surface of the peripheral wall portion may be ensured to be large.

In addition, by changing the width of the other flange portion in the radial direction, a vibration mode of the stator holder may be adjusted.

According to the aspect of (3), falling of the peripheral wall portion toward the flange portion is prevented by the convex portion, and thus deformation of the peripheral wall portion may be suppressed.

In addition, by changing the positions of the convex portions in the peripheral direction according to the shape of the flange portion, the rigidity in the peripheral direction may be adjusted.

According to the aspect of (4), the area where the peripheral wall portion abuts on the stator piece may be ensured to be large.

According to the aspect of (5), without changing the shape of the other end edge in the axial line direction of the peripheral wall portion of the stator holder, deformation of the peripheral wall portion itself in the radial direction is suppressed, and thus the rigidity of the stator holder over the entire periphery may be increased.

DESCRIPTION OF EMBODIMENTS (First Embodiment)

Hereinafter, a first embodiment of a stator of the present invention will be described with reference to the drawings.

Figure 1:
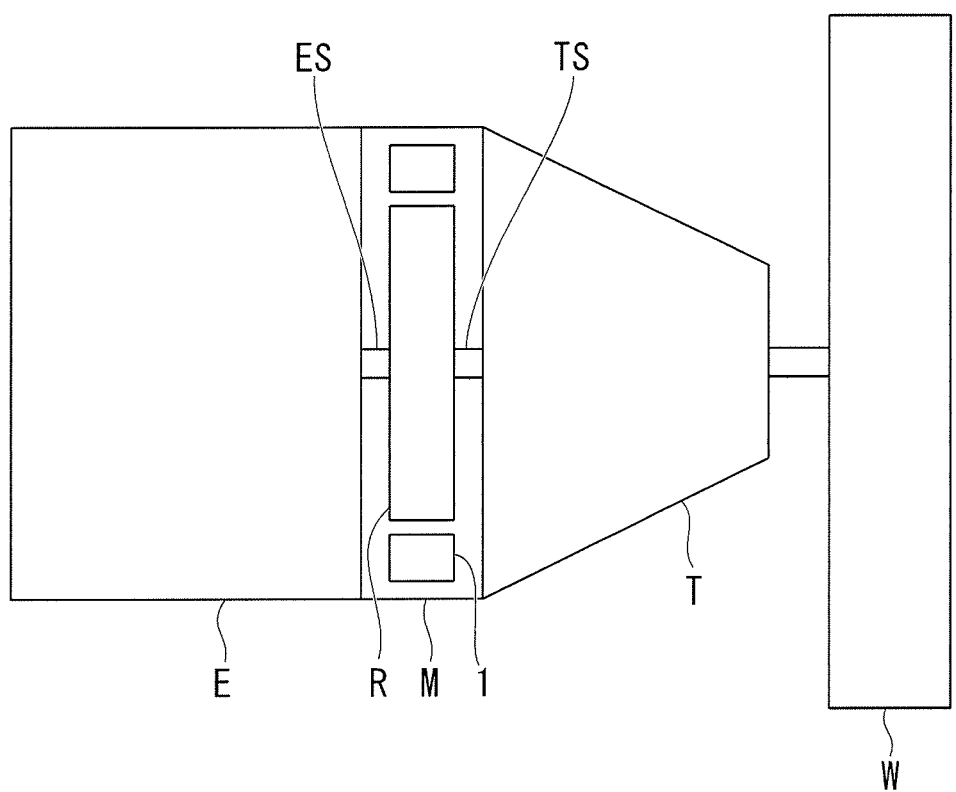
FIG. 1 is a schematic diagram of a driving system of a hybrid vehicle which uses a motor including a stator according to the present invention as one of the driving sources.

The stator of this embodiment has been used in a driving motor of a hybrid vehicle. As illustrated in FIG. 1, the hybrid vehicle includes an internal combustion engine E (engine) and a motor M (rotating electrical machine) as driving sources. In the motor M, an output shaft ES of the internal combustion engine E and an input shaft TS of a transmission T are connected to a rotor R that rotates inside the stator 1. The driving forces of the internal combustion engine E and the motor M are transmitted to a drive wheel W (wheel) via the transmission T, and the hybrid vehicle runs by at least one power of the internal combustion engine E and the motor M as the driving force. In addition, in the hybrid vehicle, when the electric power is transmitted from the drive wheel W side to the motor M side during deceleration, the motor M functions as a generator and recovers the kinetic energy of the vehicle body as electrical energy to a power storage device (not shown) through regenerative braking.

Figure 2:
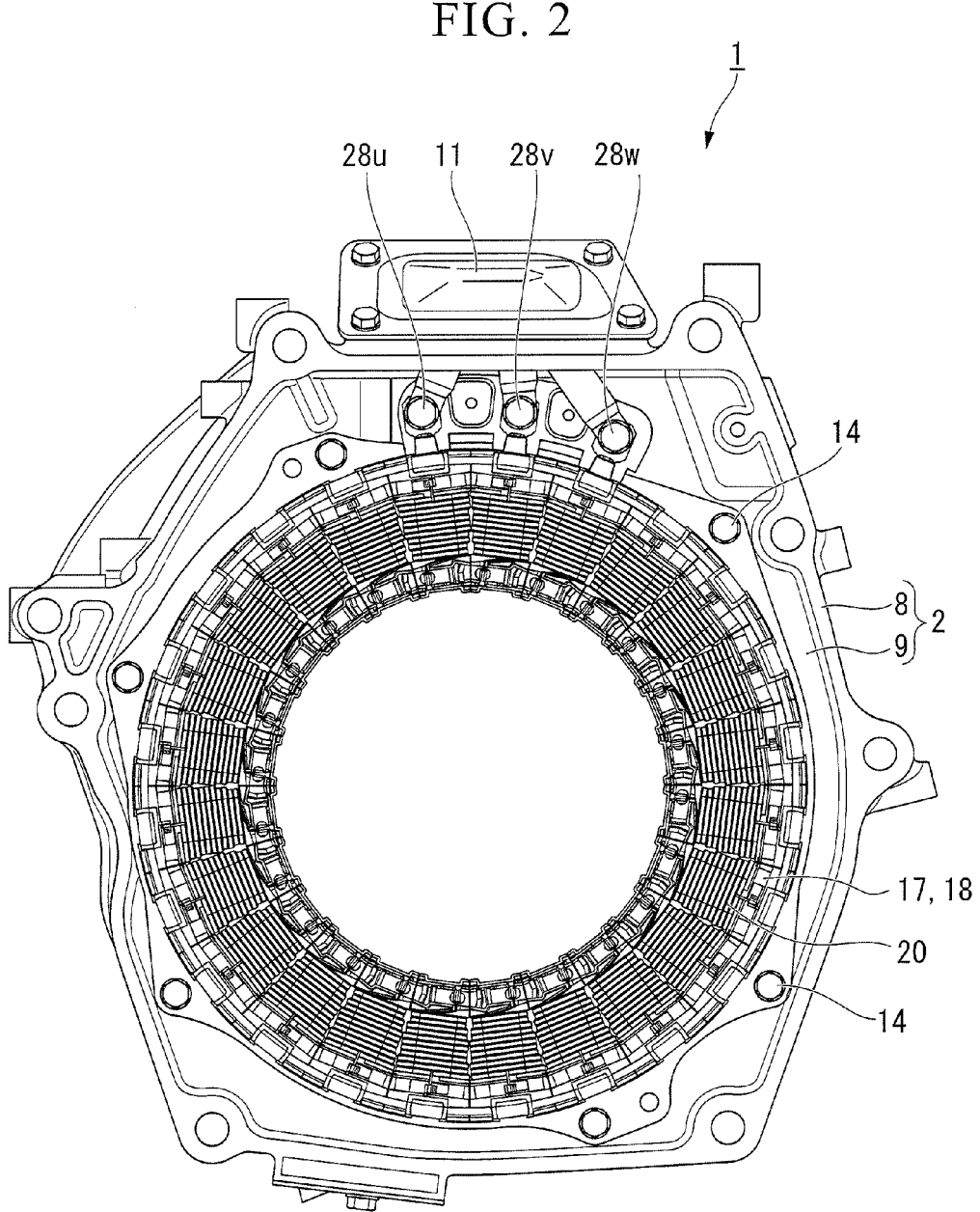
FIG. 2 is a front view of a stator according to a first embodiment of the present invention.
Figure 3:
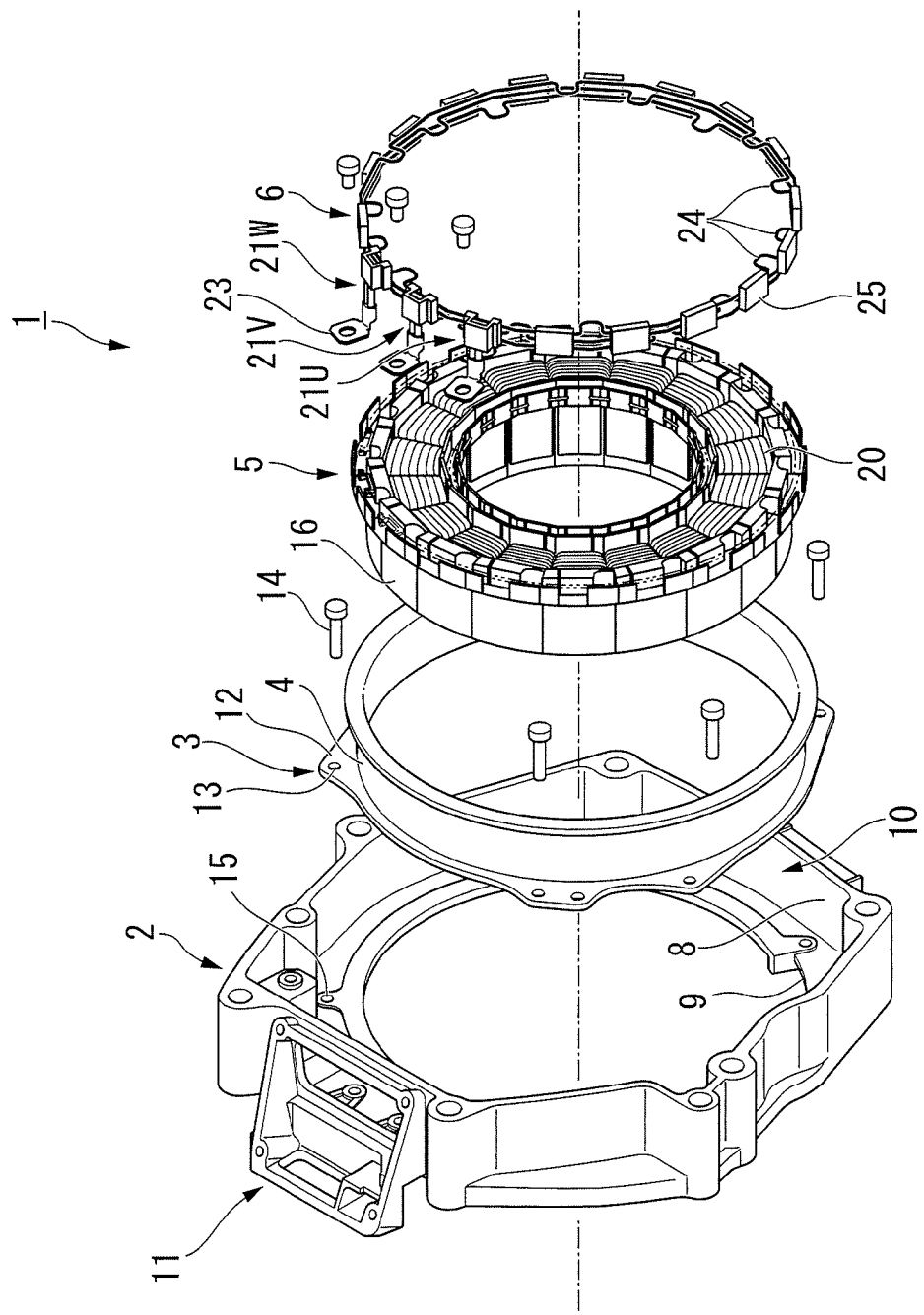
FIG. 3 is an exploded perspective view of the stator.

As illustrated in FIGS. 2 and 3, the stator 1 includes: a housing 2 made of an aluminum alloy; a stator holder 3 which is fixed to an internal space 10 of the housing 2 and is made of iron; an annular stator group 5 supported by a peripheral wall portion 4 of the stator holder 3; and an annular power distribution member 6 (bus ring).

The housing 2 forms the housing of the motor M, and is interposed between the internal combustion engine E and the transmission T to be connected and fixed therebetween.

The housing 2 includes an annular housing cylindrical portion 8 and a housing flange portion 9 which is provided to protrude inward in the radial direction (cylindrical radial direction) from one end portion in the axial line direction of the housing cylindrical portion 8 (cylindrical axial direction). The internal space 10 of the housing 2 is formed in such a shape that the stator holder 3 and the annular stator group 5 are able to be stored therein. In addition, the housing 2 includes a terminal box 11 that is connected to the internal space 10.

Figure 4:
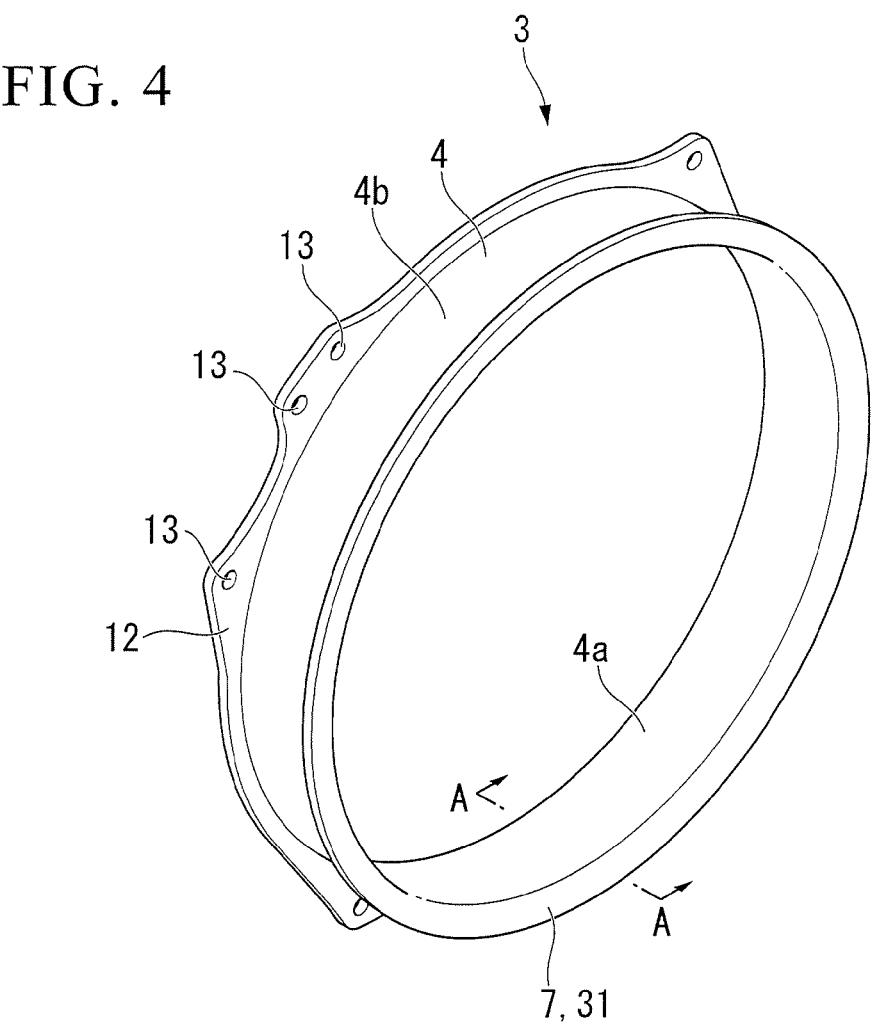
FIG. 4 is a perspective view of a stator holder according to the first embodiment of the present invention.
Figure 5:
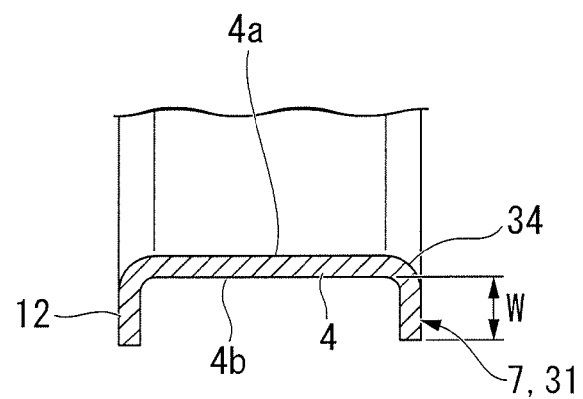
FIG. 5 is a cross-sectional view taken along the line A-A of FIG. 4.

As illustrated in FIGS. 4 and 5, the stator holder 3 includes: a cylindrical peripheral wall portion 4; a flange portion 12 which is provided to protrude outward in the radial direction from one end portion in the axial line direction of the peripheral wall portion 4; and a reinforcing portion 7 which is provided at an outer peripheral surface 4b of the peripheral wall portion 4. Specifically, the reinforcing portion 7 is a second flange portion (the other flange portion) 31 that protrudes outward in the radial direction of the stator holder 3 from the other end edge in the axial line direction of the peripheral wall portion 4. In addition, the peripheral wall portion 4 of the stator holder 3 is formed in such a shape that the annular stator group 5 is able to be stored therein by press-fitting.

A plurality of bolt mounting holes 13 . . . are provided in the flange portion 12, and by screwing bolts 14 . . . (see FIG. 3) inserted through the bolt mounting holes 13 . . . to bolt mounting holes 15 . . . provided in the housing flange portion 9 of the housing 2, the stator holder 3 is fixed to the housing 2. The amount of the flange portion 12 protruding in the radial direction is not constant, and the protruding amount is increased at positions where the bolt mounting holes 13 are formed.

As illustrated in FIG. 5, the second flange portion 31 has the same thickness as those of the peripheral wall portion 4 and the flange portion 12. In addition, an arc surface 34 is formed at a corner portion formed by the second flange portion 31 and the peripheral wall portion 4 in a rounded shape over the entire periphery. Appropriately, the second flange portion 31 is formed by a bending process using a press process.

A width W in the radial direction of the second flange portion 31 and a measurement R of the arc surface 34 are appropriately set depending on the specification of the weight of the stator 1, the installation space of the stator holder 3, and the like on the basis of the strength required for the stator 1.

The annular stator group 5 is configured by arranging a predetermined number of (24 in this embodiment) stator pieces 16 . . . in an annular shape. Each of the stator pieces 16 is configured to include a split core 17, an insulating resin 18 mounted to the split core 17, and a stator coil (coil) 20. The split core 17 has a configuration in which a substantially T-shaped magnetic steel sheet made of a back yoke at the outer peripheral side of the annular stator group 5 and magnetic pole teeth protruding toward the inner peripheral side of the annular stator group 5 is laminated, and the stator coil 20 is wound around the split core 17 via the insulating resin 18.

As illustrated in FIG. 3, the power distribution member 6 is configured by concentrically arranging U-phase, V-phase, and W-phase bus rings (power supply lines) 21U, 21V, and 21W that form ring shapes having the same diameter to be shifted from each other in the axial line direction, and fastening the three-phase bus rings 21U, 21V, and 21W using resin mold portions 25 . . . at predetermined intervals in the peripheral direction. Connection portions 24 . . . protruding inward in the radial direction are provided to the bus rings 21U, 21V, and 21W at predetermined intervals in the peripheral direction, and the connection portion 24 . . . for each of the phases is disposed so as not to overlap the connection portions 24 . . . for the other phases in the peripheral direction. In addition, connection terminals 23 respectively extend outward in the radial direction from the bus rings 21U, 21V, and 21W for the respective phases.

As illustrated in FIG. 2, the connection portions 24 . . . of the bus rings 21U, 21V, and 21W for the respective phases are connected to one ends of the stator coils 20 of the corresponding stator pieces 16, and the connection terminals 23 for the respective phases are connected to power feeding terminals 28U, 28V, and 28W inside the terminal box 11. Furthermore, the other ends of the stator coils 20 of the adjacent stator pieces 16 are connected by a predetermined method such as using a neutral point bus bar.

Therefore, one ends of the stator coils 20 . . . of the stator pieces 16 . . . for the U-phase are connected to each other with the bus ring 21U, one ends of the stator coils 20 . . . of the stator pieces 16 . . . for the V-phase are connected to each other with the bus ring 21V, and one ends of the stator coils 20 . . . of the stator pieces 16 . . . for the W-phase are connected to each other with the bus ring 21W.

A procedure for assembling the stator 1 configured as described above will be described.

First, the stator holder 3 is mounted to the housing 2. Next, the annular stator group 5 formed by arranging the stator pieces 16 in the annular shape in advance is press-fitted to the stator holder 3. Here, since the arc surface 34 is formed on the other end side in the axial line direction of the stator holder 3 (the opposite side to the flange portion 12), the annular stator group 5 is able to be easily press-fitted to the stator holder 3.

Figure 6:
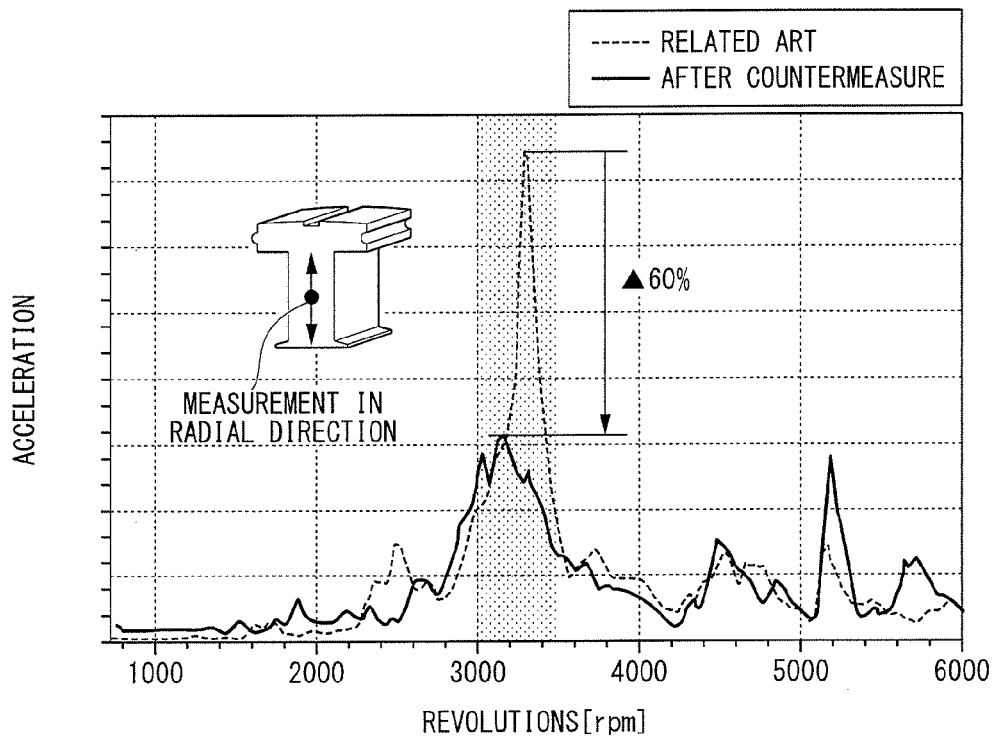
FIG. 6 is a graph showing the relationship between revolutions of the motor and vibration acceleration of stator pieces, and is a graph showing the comparison between the first embodiment and the related art.

In FIG. 6, the measurement result of measuring the vibration acceleration of the arbitrary stator piece 16 in the radial direction when the motor M is driven is illustrated.

In the graph of FIG. 6, the vertical axis represents acceleration, and the horizontal axis represents revolutions (rpm). "Related art" shows a result (dashed line) of the case of using the stator including the stator holder 103 of the related art illustrated in FIG. 12, and "After countermeasure" shows a result (solid line) in the case of using the stator according to this embodiment. The acceleration of the stator piece 16 is measured by installing an accelerometer in an arbitrary stator piece 16.

According to the measurement result, as the stator 1 of this embodiment is used, in a range in which the revolutions of the motor M are 3000 rpm to 3500 rpm, the vibration acceleration of the stator piece 16 may be considerably reduced.

Figure 7:
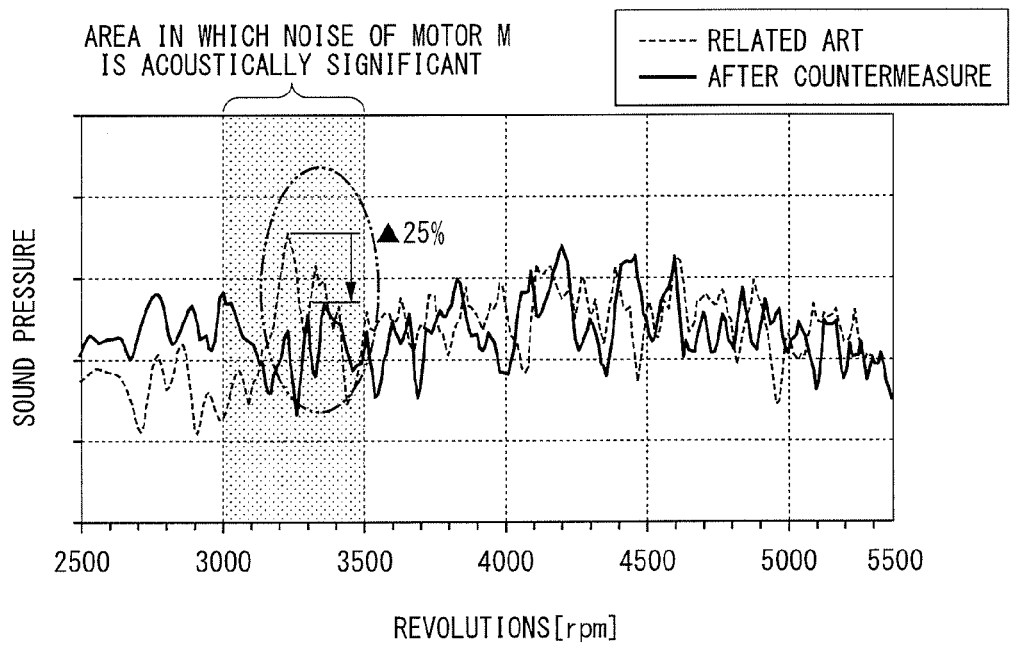
FIG. 7 is a graph showing the relationship between revolutions of the motor and sound pressure, and is a graph showing the comparison between the first embodiment and the related art.

In FIG. 7, the measurement result of measuring the vehicle interior sound of a hybrid vehicle is illustrated.

In FIG. 7, the vertical axis represents sound pressure, and the horizontal axis represents revolutions (rpm). "Related art" shows a result (dashed line) in the case of using the stator including the stator holder 103 of the related art illustrated in FIG. 12, and "After countermeasure" shows a result (solid line) in the case of using the stator according to this embodiment.

According to the measurement result, as the stator 1 of this embodiment is used, in a range in which the rotation speed of the motor M is 3000 rpm to 3500 rpm, the range in which the noise of the motor M is acoustically significant, sound pressure may be considerably reduced.

According to the above embodiment, since the flange portion 12 is provided at the one end portion in the axial line direction of the peripheral wall portion 4 of the stator holder 3 and the second flange portion 31 that continuously protrudes outward in the radial direction from the other end edge in the axial line direction is provided, deformation of the stator holder 3 in the radial direction may be suppressed. Accordingly, vibration of the stator pieces 16 . . . that constitute the stator 1 is suppressed, and thus the vehicle interior sound may be reduced.

In addition, since the second flange portion 31 is provided over the entire periphery of the peripheral wall portion 4, deformation of the peripheral wall portion 4 in the radial direction is suppressed by the flange portion 12 and the second flange portion 31, and thus the rigidity of the stator holder 3 may further be increased.

In addition, an inner peripheral surface 4a of the peripheral wall portion 4 is flat, and thus the area where the annular stator group 5 abuts on the inner peripheral surface 4a of the peripheral wall portion 4 may be ensured to be large.

In addition, by changing the width W of the second flange portion 31 in the radial direction, a vibration mode of the stator holder 3 may be adjusted.

(Second Embodiment)

Next, a second embodiment of the present invention will be described with reference to the drawings. This embodiment has the same structure as that of the first embodiment except for the reinforcing portion 7 of the stator holder 3, and thus a description thereof will be omitted here.

Figure 8:
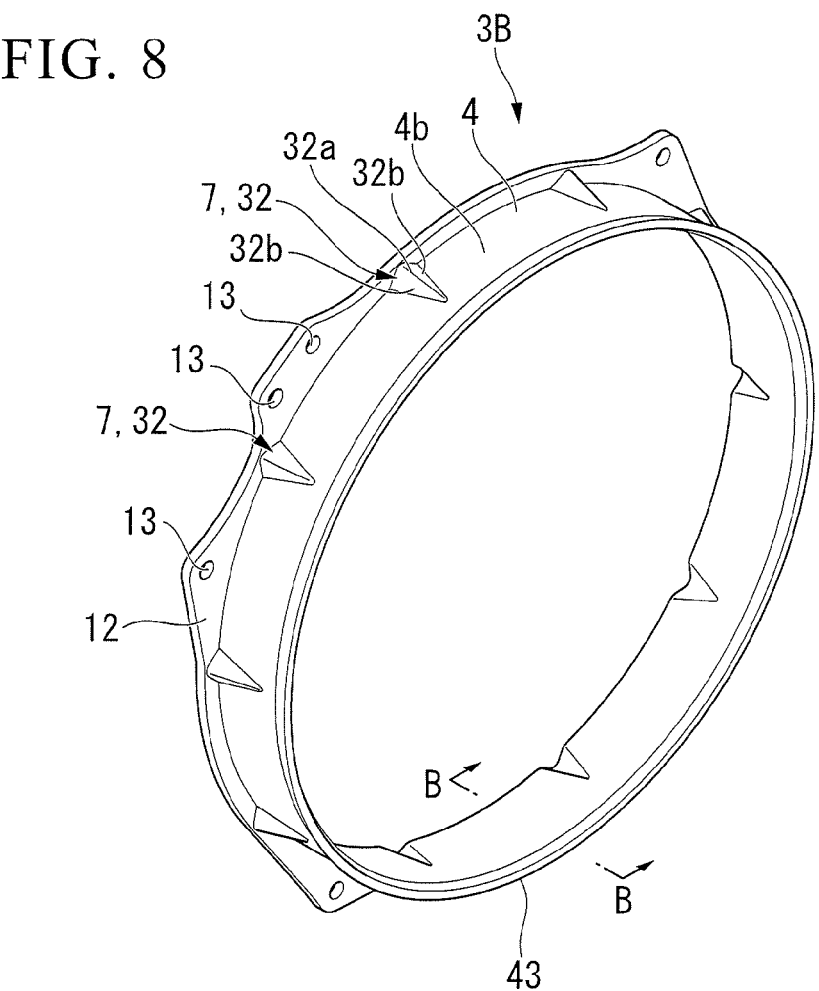
FIG. 8 is a perspective view of a stator holder according to a second embodiment of the present invention.
Figure 9:
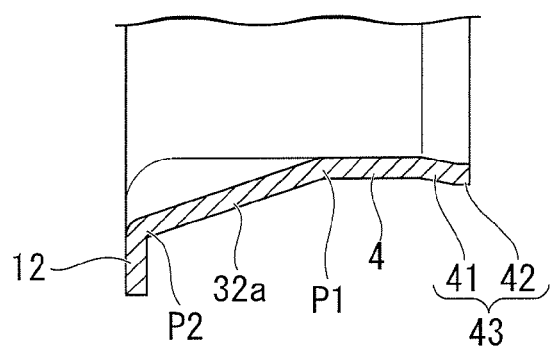
FIG. 9 is a cross-sectional view taken along the line B-B of FIG. 8.

As illustrated in FIGS. 8 and 9, a reinforcing portion 7 of a stator holder 3B of this embodiment is a plurality of convex portions 32 . . . provided across the corner portion between the outer peripheral surface 4b of the peripheral wall portion 4 and the flange portion 12. The plurality of convex portions 32 . . . are arranged at predetermined intervals in the peripheral direction of the peripheral wall portion 4. Specifically, each of the convex portions 32 is made by deforming the corner portion between the peripheral wall portion 4 and the flange portion 12 to protrude outward in the radial direction at an arbitrary position of the stator holder 3B in the peripheral direction. The convex portion 32 includes a ridge line portion 32a and side surfaces 32b and 32b.

The ridge line portion 32a is a line that connects an arbitrary point P1 in the vicinity of the center portion of the peripheral wall portion 4 in the axial line direction and a point P2 on the plain including the axial line of the peripheral wall portion 4 and the P1 and on the flange portion 12. The side surface 32b and 32b are symmetrical to each other with respect to the ridge line portion 32a and are surfaces provided to intersect each other at an angle of about 90°.

Since the ridge line portion 32a and the side surfaces 32b and 32b are formed as described above, the convex portion 32 is formed so that the protruding height thereof in the radial direction is gradually reduced from the flange portion 12 to reach the peripheral wall portion 4. Similarly to the second flange portion 31 of the first embodiment, the convex portions 32 . . . are formed by a press process.

As described above, the convex portions 32 . . . are arranged at arbitrary positions in the peripheral direction at predetermined intervals. It is preferable that the position of each of the convex portions 32 be appropriately determined depending on the shape of the flange portion 12, and particularly, be formed at such a place that the width of the flange portion 12 in the radial direction is reduced.

Figure 12:
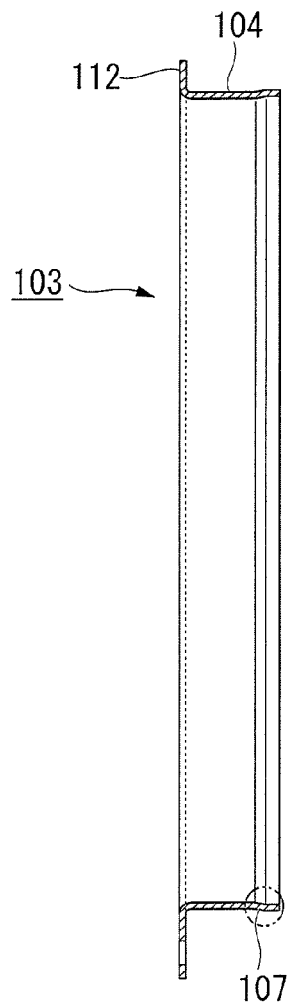
FIG. 12 is a cross-sectional view of a stator holder of the related art.
Figure 13:
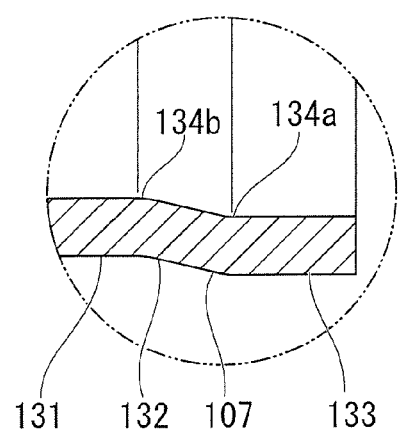
FIG. 13 is an enlarged cross-sectional view of main parts of the stator holder of the related art.

In addition, at the other end side in the axial line direction of the peripheral wall portion 4 of the stator holder 3B of this embodiment, similarly to the stator holder 103 of the related art illustrated in FIG. 12, an introduction portion 43 including a tapered cylindrical portion 41 and a large-diameter cylindrical portion 42 is provided.

According to the embodiment described above, in addition to the effect of the first embodiment, falling of the peripheral wall portion 4 toward the flange portion 12 is prevented by the convex portions 32 . . . , and thus deformation of the peripheral wall portion 4 may be suppressed.

In addition, by changing the positions of the convex portions 32 . . . in the peripheral direction according to the shape of the flange portion 12, the rigidity in the peripheral direction may be adjusted.

In addition, since each of the convex portions 32 has such a shape that the protruding height is gradually reduced from the flange portion 12 to reach the peripheral wall portion 4, compared to a case where a convex portion is provided from one end portion to the other end portion in the axial line direction of the peripheral wall portion 4, the area where the peripheral wall portion 4 abuts on the stator piece 16 may be ensured to be large.

Furthermore, without changing the shape of the other end edge in the axial line direction of the peripheral wall portion 4 of the stator holder 3B, the rigidity of the stator holder 3B may be increased.

(Third Embodiment)

Next, a third embodiment of the present invention will be described with reference to the drawings. This embodiment has the same structure as those of first and second embodiments except for the reinforcing portion 7 of the stator holder 3, and thus a description thereof will be omitted here.

Figure 10:
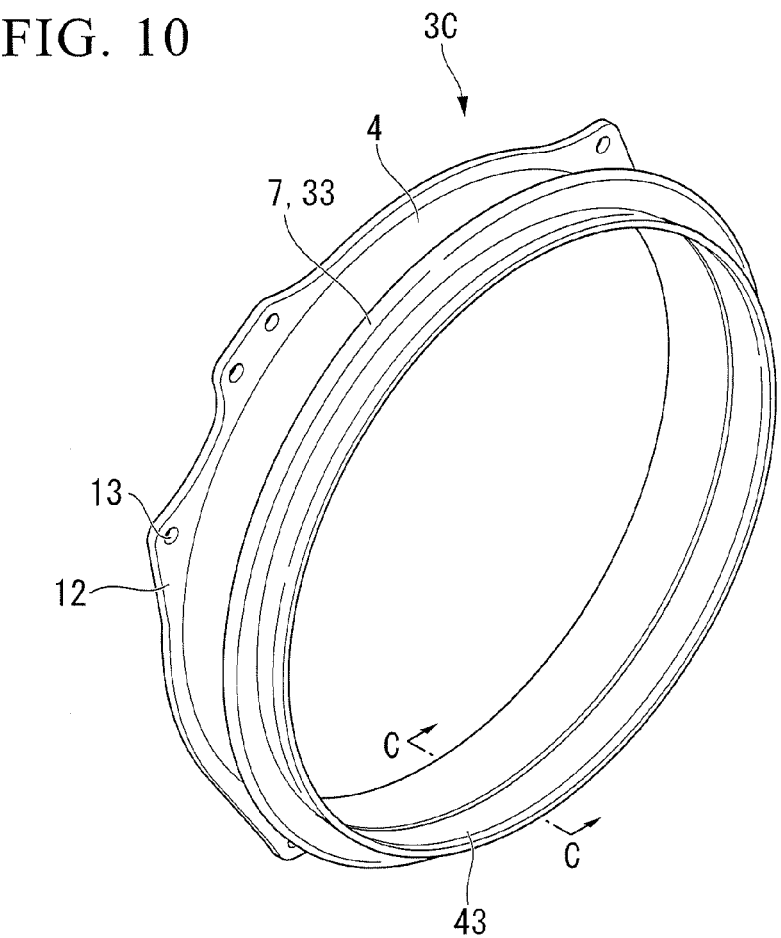
FIG. 10 is a perspective view of a stator holder according to a third embodiment of the present invention.
Figure 11:
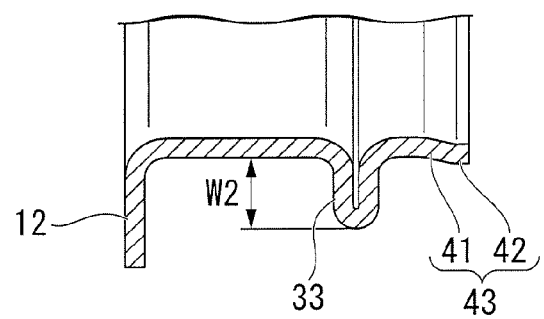
FIG. 11 is a cross-sectional view taken along the line C-C of FIG. 10.

As illustrated in FIGS. 10 and 11, a reinforcing portion 7 of a stator holder 3C of this embodiment is a convex strip 33 that continuously protrudes from the outer surface of the peripheral wall portion 4. The convex strip 33 protrudes outward in the radial direction from substantially the center potion of the peripheral wall portion 4 in the axial line direction.

Specifically, the convex strip 33 has a shape in which the peripheral wall portion 4 is bent outward in the radial direction over the entire periphery at substantially the center portion of the peripheral wall portion 4 in the axial line direction and is folded inward in the radial direction at a predetermined position in the radial direction. The convex strip 33 is formed by a press process. Similarly to the first embodiment, a width W2 of the convex strip 33 in the radial direction is appropriately set depending on the specification of weight of the stator 1, the installation space of the stator holder 3C, and the like.

According to the embodiment described above, without changing the shape of the other end edge in the axial line direction of the peripheral wall portion 4 of the stator holder 3C, deformation of the peripheral wall portion 4 itself in the radial direction is suppressed, and thus the rigidity of the stator holder 3C over the entire periphery may be increased.

In addition, by changing the width W2 of the convex strip 33 in the radial direction, a vibration mode of the stator holder 3C may be adjusted.

(Other Embodiments)

In addition, the present invention is not limited to the above-described embodiments.

For example, in the first embodiment described above, the second flange portion of the stator holder 3 is provided over the entire periphery of the edge portion of the peripheral wall portion 4, but may also be provided along the edge portion of the peripheral wall portion 4. In addition, the second flange portion 31 or the convex strip 33 is configured to be integrated by the press molding, but may also be configured by preparing an additional annular member and joining the member to the peripheral wall portion 4 using a method such as welding.

In addition, the above-described embodiments are examples in which the present invention is applied to the stator of a hybrid vehicle or a driving motor. However, the present invention may also be applied to the stator of a driving motor in an electric vehicle or other motors and generators.

INDUSTRIAL APPLICABILITY

According to the present invention, the stator capable of suppressing vibration noise by suppressing deformation of the stator holder in the radial direction may be provided.

REFERENCE SIGNS LIST 1 stator
2 housing
3 stator holder
4 peripheral wall portion
4b outer peripheral surface
7 reinforcing portion
12 flange portion
16 stator piece
20 stator coil (coil)
31 second flange portion (another flange portion)
32 convex portion
33 convex strip

The invention claimed is:
1. A stator comprising:
a housing;
a plurality of stator pieces, arranged in an annular shape, around which coils are wound;
a stator holder fixed to an internal space of the housing, said stator holder comprising a peripheral wall portion configured to support the plurality of stator pieces,
wherein the stator holder comprises:
a first flange portion is fixed to the housing and continuously protrudes outward in a radial direction thereof from an edge of one end side in an axial line direction thereof; and
a reinforcing portion configured to suppress vibration in the radial direction of the stator holder is arranged on an outer peripheral surface of the peripheral wall portion that is opposite the first flange portion, and
wherein an arc surface is formed at a corner portion formed by the reinforcing portion and the peripheral wall portion.

2. The stator according to claim 1, wherein
the reinforcing portion is a second flange portion that continuously protrudes outward in the radial direction from an edge of the other end side in the axial line direction of the peripheral wall portion of the stator holder.

3. The stator according to claim 2, wherein
an outer edge of the second flange portion is formed in a circular shape.

4. The stator according to claim 3, wherein
the first flange portion has a fastening portion fastened to the housing, and
the outer edge of the second flange portion is positioned at an inner side of the fastening portion in the radial direction.

5. The stator according to claim 1, wherein
the reinforcing portion is a plurality of convex portions provided across a corner portion between the outer peripheral surface of the peripheral wall portion and the first flange portion, and
the plurality of convex portions are arranged at predetermined intervals along the peripheral direction.

6. The stator according to claim 5, wherein
the convex portion has a shape in which a protruding height thereof is gradually reduced from the first flange portion to reach the peripheral wall portion.

7. The stator according to claim 1, wherein
the reinforcing portion is a convex strip which continuously protrudes from the outer peripheral surface of the peripheral wall portion.

\* \* \* \* \*